INVENTOR.
John E. Lindberg, Jr.
BY A. Donham Owen
ATTORNEY.

United States Patent Office 2,985,870
Patented May 23, 1961

2,985,870

ENGINE ANALYZER FOR DETECTING TEMPERATURE WITH TRANSDUCER AND CIRCUITS

John E. Lindberg, Jr., 953 Hawthorne Drive, Lafayette, Calif.

Filed Oct. 28, 1953, Ser. No. 388,831

20 Claims. (Cl. 340—227)

This invention relates to an engine analyzer for detecting changes in temperature or pressure.

One deficiency with engine analyzers heretofore in use was in failing to detect and indicate critical changes in temperature, such as excessive temperature in any one of the combustion chambers or such as fires occurring in the engine. The present invention solves that problem with the aid of a novel transducer, in which temperature or pressure changes are utilized to produce changes in an electric circuit. The engine analyzer, utilizing this tranducer can be used for temperature sensing and fire detecting.

The analyzer of this invention also is applicable to other types of maximizing systems including control systems for controlling the fuel flow on jet aircraft, so that all combustion chamber temperatures are continuously surveyed and the highest temperature is automatically maintained as near as possible to the safe critical temperature of the combustion chamber, that is as high a temperature as the combustion chamber can safely be operated at without exceeding the temperature above which the component parts would fail. It is desirable to operate at as high a temperature as is safely possible, because the power and efficiency of a power plant increases with increased operating temperature.

This application is a continuation-in-part of application Serial No. 318,291, filed November 1, 1952, and now abandoned. A companion application, Serial No. 388,832, filed October 28, 1953, now Patent No. 2,759,172, issued August 14, 1956, relates particularly to an analyzer employing a transducer with a self-healing interior coating on its interior surface.

The novel transducer is very sensitive to a predetermined critical temperature or pressure. It is characterized by its extreme simplicity of operation and of manufacture, by its great versatility, and by its ability to replace complicated and expensive appartus heretofore in use. As a result, it has solved important problems in systems such as engine analyzers where indication of or control by a critical temperature or pressure is needed, of which engine analyzer temperature sensing as a fire-detection warning will serve as an example.

Fire detecting systems heretofore in use have employed moving parts, electronic circuit, or other delicate and expensive equipment which has been prone to get out of order readily and has also been difficult to repair. The expense of the sensitive elements themselves and of the systems as a whole has prevented wide use of fire-detecting devices and has confined them heretofore to places where they were absolutely essential. Many fire-detecting devices were seriously affected by vibration or by a change in attitude, so that they were useless in such applications as warning systems in aircraft.

The single point type detectors commonly used in the past suffer from the additional problem that they can only detect excessive temperature at a preselected single point, which commonly turned out not to be the point at which fire occurred. In an attempt to overcome this difficulty, systems were built incorporating many single point detectors distributed through the zone to be protected and wired together. This proved unsatisfactory due to complexity, wiring failures, and sensitivity loss, because each additional detector lowered the circuit sensitivity, and even with the many detectors, it was a comcon occurrence for there to be no detector in the right point to detect the fire.

To overcome these problems, attempts have been made to develop a satisfactory continuous type fire detector so that the complexities would be eliminated and the continuous type transducer element could readily be distributed through the zone to be protected.

However, many, if not most of the continuous type fire-detecting systems heretofore in use would not react at the same temperature each time; the triggering temperature depended on the length of detector element exposed to the higher temperature. For expample, with some fire detectors a temperature of about 400° F. acting over a one-foot length of a sensitive element has the same effect as a 750° F. temperature acting over a few inches of the same sensing element. Not only in this instance, but in other instances, prior art fire-detecting devices were likely to give false alarms so that the user was never sure whether anything significant had been detected or not.

My invention is a transducer of the continuous element type so designed that it will show an immediate large increase in resistance when any point or points along the entire length of the element reach the pre-selected critical temperature. The setting is not affected by the length of the exposed element.

The present invention has solved these problems by providing a novel type of transducer in which the change of state of a liquid to a gas is used to interrupt an electric current. The boiling point of a liquid depends solely on the composition of the liquid, the pressure, and the temperature. By deciding upon one specific liquid, and by holding the pressure constant, the reaction will always occur at the identical temperature. Similarly, if the temperature is held constant, the reaction will always occur at the same pressure.

When an electrically conductive liquid changes to a gas, the increase in resistance is tremendous. Even a single fraction of an inch of gas interrupting a long tube full of liquid, will cause substantially complete interruption of current flow. For example, a liquid may have a resistance of 300,000 ohms across a one-foot path. If even a single bubble of vapor breaks the continuity of this path, and if there is no possibility of shorting around this gas bubble, the resistance becomes substantially infinite, many millions of ohms. This very sharp break enables accurate detection of a precise temperature. By connecting the transducer in parallel with a warning light such as a neon flash tube or with a relay that operates a warning light or an audible signal, the instant that a single vapor bubble appears at any point along the transducer or in any one of a series of transducers, all the voltage will pass through the warning relay or warning light and give a signal. That is one of the principles of my new transducer and of its application to a fire or critical-temperature or critical-pressure detecting system.

One advantage of my invention is that an increase beyond the critical temperature at any point along the transducer will have the same effect as an increase over a wide area. Any one transducer, once filled with liquid, will respond throughout at the same temperature pressure level. A series of identical transducers will all respond in the same way. When desired, by using different pressures with the same liquids or by using different liquids, in different transducer elements, a series of different transducers may be made so that each transducer can be responsive to a different critical temperature and still give the same signal.

The invention has other advantages. The transducer is filled with liquid; there are no void spaces. Any expansion occurs in the container itself. Therefore, it is unaffected by vibration or by a change in attitude or by being subjected to very low temperatures below the freezing point of the liquid. No electronic system or moving parts are required. The individual elements may be made about the same size as relatively small diameter wire; a series of them may be joined together to give whatever length is desired, and they may be placed anywhere they are desired. There is nothing to get out of order, and the entire system is very easily tested to make sure that it is operating correctly.

All of these and other objects and advantages of the invention will appear from the following description of some preferred embodiments thereof and some uses therefor, for the use of the transducer in a fire-detecting system is but one use to which this versatile element is adapted. The details of structure which are shown in the drawings and description are given in order to comply with 35 U.S.C. 112 and to make it possible for anyone to construct the device. These details may be changed, and equivalents may be subsituted. For that reason, the claims are not intended to be limited narrowly by the mention of the details in the specification.

The transducer

As stated previously, the invention provides a novel type of transducer in which the change of state of an electrically conductive liquid is used to interrupt an electric current. Many examples could be given of suitable transducers, and it would be impossible to show herein all the feasible types. However, a few examples are given, and it is believed that they serve to illustrate the principle.

The transducer 20 is shown in Figs. 1 to 5 and includes a flattened tube 21. Preferably the tube 21 is made from plastic which has sufficient strength and flexibility to accommodate the interior pressures involved. However, for some uses it may be satisfactory to make the tube 21 from glass, ceramic, metal interiorly coated with insulation, or any other material which will withstand the temperature and pressure to which the transducer 20 is to be subjected. A basic consideration is that the inside wall of the transducer tube 21 should not be conductive. If desired, a coating may be placed on the tube 21, as by applying an insulating coating on the inside surface of a metal tube. However, in this instance, care must be taken to see that the coating does not break and cause short circuits. Also, the coating must be able to withstand the temperatures with which the transducer is to be used.

An electrically conductive liquid 23 fills the tube 21. In the preferred structure there are no voids or gas-filled areas, and this fact is just one of many that distinguish the present invention from devices, which will operate only when in a particular attitude. The present invention will operate in any attitude. The liquid 23 may be an electrolyte, or liquid metal, or a liquid-suspended colloidal conductive material as "oil dag" or "aquadag" (colloidal graphite in oil or water, respectively).

Figures 1, 2, 3, 4, 6:
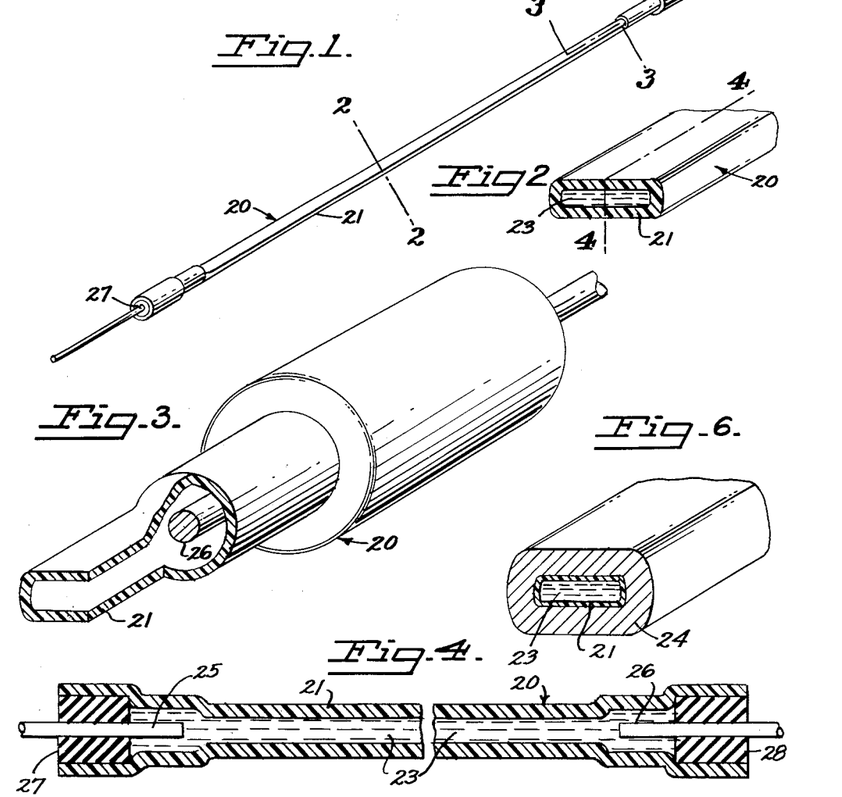
Fig. 1 is an enlarged isometric view of a transducer incorporating the principles of my invention.
Fig. 2 is a greatly enlarged isometric view in section taken along the line 2—2 of Fig. 1 and broken off to conserve space.
Fig. 3 is an isometric view greatly enlarged and partially cut away taken along the line 3—3 of Fig. 1.
Fig. 4 is a greatly enlarged longitudinal view in section, taken along the path indicated by the line 4—4 in Fig. 2 and broken in the middle to conserve space.
Fig. 6 is a view similar to Fig. 2 showing a modified form of the invention in which the transducer is held in a protecting shell.

One further remark should be made about the choice of material for the tube 21. The tube 21 should be able to withstand the maximum temperature to which the transducer 20 may be submitted. This temperature may be many times hotter than the temperature which the transducer 20 is to indicate because, when a fire occurs, the device should indicate as soon as possible that there is a fire, before the fire reaches its greatest heat. In most cases it is desirable to have a transducer 20 that will not have to be replaced after the fire, but will still be in good shape after the fire has been put out. Two choices are available here. The tube 21 may be made from a material which can withstand these temperatures. However, this is not completely necessary, for (as Fig. 6 shows) the tube 21 may be jacketed in a protecting metal sheath or shell 24. The shell 24 may be made of steel or some other metal which is well able to withstand high temperatures. It will still conduct the necessary heat energy and it will serve to retain the tube 20 in its general shape without damage, up to very high temperatures.

A further remark may also be made about the liquid 23 which is used inside the transducer. In addition to its electrical properties, it is of course essential that the liquid boil at the proper temperature. The boiling point, however, may be regulated to a considerable degree by the absolute pressure with which the liquid is retained inside the tube 21, whether this pressure be above or below atmospheric. This well-known phenomenon makes it possible to provide with great exactness for a wide range of critical temperatures, limited only by the structural limits of the transducer.

The transducer 20 has a pair of spaced-apart electrodes 25, 26, which may be, and preferably are in most cases, located at opposite ends of the tube 21. (However, they need not be; see Figs. 7 and 10.) The metal of the electrodes 25, 26, should not form a coating when in contact with whatever electrolyte 23 is used. Where metal or other conducting tube 21 is employed, the electrodes 25, 26, are insulated from the metal by members 27, 28, which may be made from ceramic or from some other type of insulating material. The members 27, 28, may be sealed to the electrodes 25, 26, and to the tube 21 to prevent leakage.

Figure 9:
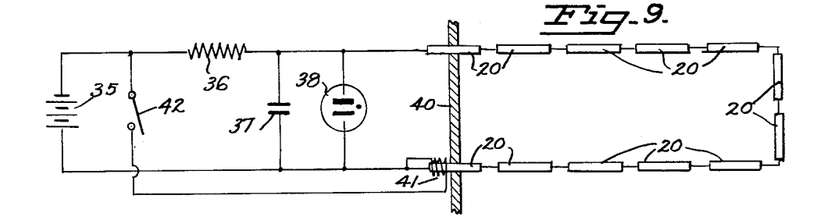
Fig. 9 is a circuit diagram showing a series of transducers joined together in a fire-detecting system.

The sensitivity of the transducer 20 is increased by making the tube 21 as small in cross-sectional area as is otherwise convenient. The smaller the tube, the less heat energy that is required to actuate it at the predetermined temperature. This is because of two things: the smaller amount of liquid to be heated and the smaller amount of liquid whose state must be changed in order to interrupt the column of liquid. With a large tube, considerable liquid would have to be heated in order to interrupt the path, and during the heating some of the adjacent liquid would have to be heated, because of the conduction and convection within the liquid. With a small tube, very little liquid has to be heated before complete discontinuity is caused by vapor. The limits of size of the tube 21 depend upon the materials available. Quite satisfactory operation has been obtained with the tube 21, whose greater diameter is approximately $\frac{1}{16}$ of an inch and whose lesser diameter is approximately $\frac{1}{32}$ of an inch, but other dimensions, of course, may be used to practice this invention. The length of the tube 21 is not a factor in this phase of operation. The tube 21 may be a few inches long or a number of feet long. Or they may be joined in series, as illustrated in Fig. 9. Preferably, the tube will be elongated and be uniform in cross-section, at least between the electrodes, so that all parts are equally responsive, and it will be a temperature-maximizing transducer.

Figures 5, 7:
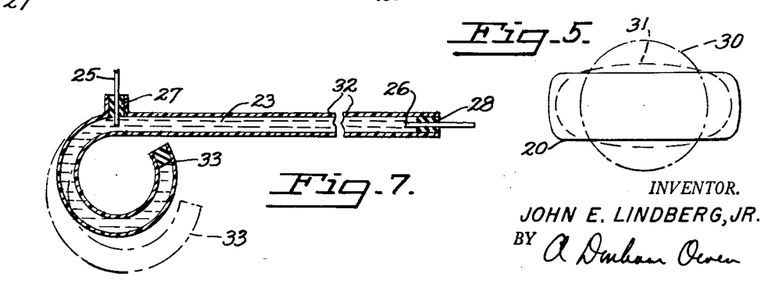
Fig. 5 is a diagrammatic view showing the change in cross section which takes place with changes of internal pressure and showing the shape toward which the tube tends to change under internal pressure, so as to take care of expansion of the fluid.
Fig. 7 is a view in section similar to Fig. 4 of a modified form of the invention in which a Bourdon tube is employed to take care of the expansion of the fluid. The view is broken in the middle to conserve space, and a partially uncurled position, assumed upon an increase in internal pressure is shown in dotted lines.

When the liquid inside the transducer becomes heated, the pressure upon the transducer tube walls is increased. Also, if the liquid freezes, the pressure may increase. Therefore, some way is preferably provided to accommodate some changes in the volume of the fluid, and in the device shown in Figs. 1 through 5 this is accomplished by using a flattened tube. Fig. 5 shows diagrammatically that such a tube 21, when subjected to high internal pressure, tends to change its shape by becoming more nearly circular. The dotted line circle 30 indicates the shape in which the same circuit of walls encloses the greatest volume and is therefore the shape where the pressure is lowest. However, the tube 21 does not actually reach that shape, but instead assumes the shape indicated by the dotted oval 31. Any change in shape from the flattened cross section toward a circular cross section increases the volume inside the tube walls and therefore relieves the fluid pressure.

Another way of handling this problem is to house the liquid 23 in a Bourdon tube 32. As Fig. 7 shows, an increase in pressure tends to uncurl or straighten out the curved portion 33 of the Bourdon tube and thereby allow for expansion in volume while maintaining the pressure at a substantially constant level.

Other ways of handling increases in fluid pressure inside the tube may be used. For example, one end of the tube may be provided with a diaphragm bellows or piston arrangement.

Summarizing the operation of the transducer itself: a current flow is maintained between the two electrodes 25 and 26 through the liquid 23. When the transducer 20 is subjected to heat at any portion along its length, that heat is conducted through the walls of the tube 21 to the liquid 23 and raises its temperature. If the temperature be excessive, eventually the liquid 23 at some point along the length of the tube 21 will reach the critical temperature-pressure figure, and it will boil. When just enough liquid, at any point, changes its state to a gas to cause a discontinuity in the liquid, the electric current between the electrodes 25 and 26 will be interrupted, and no current will flow. Since the inside wall of the tube 21 is either non-conductive or is covered with a nonconductive coating 22, there will be no short circuit around the gas gap in the liquid, and the current will remain interrupted until the temperature goes down, and then current will again flow between the electrodes 25 and 26.

The increase in internal pressure that is generally caused by an increase in temperature may be compensated for as by having the walls of the tube expand and thereby maintain a near constant pressure, or the increase in pressure may itself be used in combination with the increase in temperature to mark the critical figure at some predetermined temperature-pressure condition.

The device may also be used for indicating the attainment of a critical pressure in the same manner. The temperature may either be kept constant or be permitted to vary somewhat with the change in pressure. In either event, the vaporization of the liquid will interrupt the electric current flow through the transducer.

*Circuits showing applications of the transducer*

Several circuits to which the transducer may be applied are shown in the drawings. The circuit shown in Fig. 8 places the transducer 20 in an electric circuit having a power source 35 and a resistance 36 in series with the transducer 20. A condenser 37 and a neon flash bulb 38 are placed in parallel with each other and with the transducer 20. So long as current flows through the transducer 20, there is a voltage drop through the resistance 36, and this resistance is so chosen that the voltage available to the neon bulb 38 is less than its breakdown voltage; so no current flows through it normally.

Figure 8:
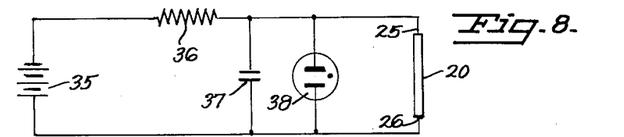
Fig. 8 is a circuit diagram showing a fire-detecting system employing the transducer of this application.

When the transducer 20 becomes heated and gas forms at any point in it, the current flow through the transducer 20 is interrupted. This means that no current flows through the resistor 36; so there is no voltage drop there. This, in turn causes a charge to build up on the condenser 37 until finally a voltage is reached there which is equal to or greater than the breakdown voltage of the neon tube 38. Then, the neon tube 38 will discharge the condenser 37, emitting a warning flash as it does so, and so long as no current flows through the transducer 20, the condenser 37 will alternately become charged by the power source 35 and discharged by the neon lamp 38. When and if all the fluid 23 in the transducer 20 cools and reaches the liquid state, current will flow through it and through the resistance 36, and the neon bulb 38 will cease flashing.

Figure 16:
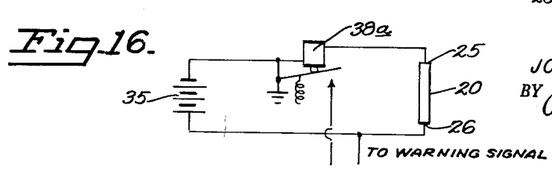
Fig. 16 is a circuit diagram similar to Fig. 8, with a series-connected relay in place of a parallel-connected flasher light.

Instead of a neon bulb 38, a relay or other warning signal may be used and may be in series with a neon bulb or other device that draws current only when the transducer 20 gases. The relay, if used, may operate a fire extinguisher ($CO_2$ system on aircraft or sprinkler system for industrial or home use) or other remedial device. Fig. 16 shows a circuit where a relay 38a is in series with the transducer and operates a remote warning signal.

Fig. 9 shows another very simple but very practical circuit, employing a series of transducers 20. Again the source 35 of direct current is connected through a resistor 36 to the series of transducers 20, and the condenser 37 and neon flasher 38 are in parallel with the tansducers 20. The transducers 20 are linked together by wires and may be disposed in any pattern anywhere; for example, they may encircle an aircraft engine. All of the transducers 20 except a portion of the first and last ones are shown as beyond a fire wall 40.

Fig. 9 also shows a test device by which the transducer 20 may be checked periodically. A heating coil 41 surrounds the last tube 21, and a switch 42 is provided to control the current through the coil 41. Whenever the heater 41 is turned on, it soon reaches a temperature above the boiling point of the liquid 23 inside the transducer 20. When the liquid 23 boils, there is a gap, a discontinuity, in the liquid, the current flow between the electrodes 25 and 26 ceases, and the neon flash bulb 38 is lighted. This indicates to the operator that the device is working satisfactorily, and the switch 42 may then be turned off. By placing the heater 41 on the last transducer 20, the flashing of the neon tube 38 means that the entire circuit is working in proper order.

It may be noted in passing that instead of having a closed circuit a grounded circuit may be employed where there is only one transducer 20, but a closed circuit is better and is far preferable with a series of transducers 20, to prevent a short circuit to ground at one transducer from nullifying all the subsequent transducers, as could occur in a ground-return circuit. If there were such grounding, interruption of the circuit in shorted-out transducers would not be noticed, because the current would still pass around them. In an ungrounded circuit, any one transducer may be grounded without affecting the operation and even if two are grounded, only the elements between the grounded elements are nullified. The remainder of the fire detection apparatus continues to function normally. A fully ungrounded system, however, is still more effective.

In speaking of a grounded return circuit, what is meant is that the low potential electrode 26 or the wire to it is grounded, and not that the transducer body 21 is grounded. In the preferred embodiment the transducer body 21 is not grounded, because there is much more insurance against error when the transducer tube 21 is not grounded. For, before a transducer circuit can be grounded, both the transducer tube 21 must be grounded and the coating 22 must be broken. No harm would come from either one of these two conditions so long as both are not present. If both are present in a ground return circuit, the transducer is not operative over the range between the break and its low potential electrode, but the remainder is still operative. In an ungrounded system, no harm is done by a single grounding through broken coating. If, however, in a series of transducers, two such insulation breaks should occur and if both insulation breaks should be in transducer tubes that were grounded, then all the transducers in between these two breaks would be shorted out, and if their fluid boiled, there would be no indication.

It may also be added that the condenser 37 could be omitted and the circuits would still work, though less well. Also, alternating current may be used in place of direct current, and then the condenser 37 should be left out.

Alternating current circuit

Figure 15:
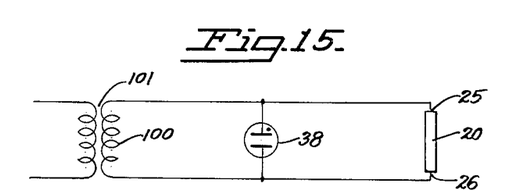
Fig. 15 is a circuit diagram showing the use of alternating current in a maximum-temperature detecting system.

Fig. 15 shows how the transducer 20 of the present application can be used with alternating current. The transducer 20 has its electrodes 25, 26, connected across the secondary 100 of a transformer 101, as a source of A.-C., with the neon flasher lamp 38 or a peak-voltage relay) in parallel with the transducer 20. No condenser 37 is used here, as it would short-circuit the A.-C. Secondary 100 provides an alternating voltage source greater than the trigger voltage of the neon tube 38, or other warning device that is to be used; therefore when heat causes the conducting fluid in 20 to boil and a bubble interrupts the current flow between electrodes 25 and 26, the warning light or device will give an intermittent warning at the frequency of the alternating current source.

Figure 10:
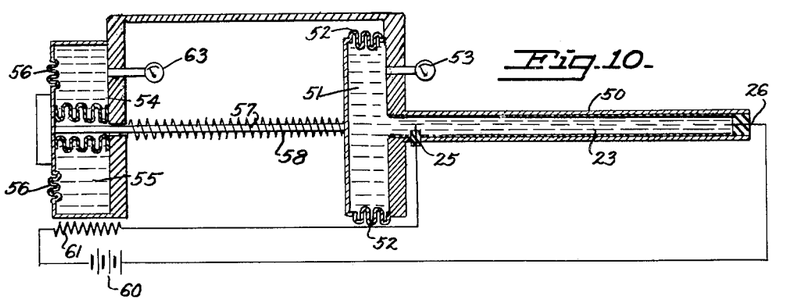
Fig. 10 is a circuit diagram showing how one of my transducer elements may be used to give a reading of the maximum temperature present over a given area.

A hunting circuit using the transducer to give a reading of the maximum temperature over the full length of the transducer The transducer 50 of Fig. 10 is similar to the transducer 20 except that one electrode 25 is not placed in the end of the tube but rather through the side near one end, and an expansion chamber 51 is provided for the fluid 23 beyond this electrode 25. The expansion chamber is bounded by a bellows 52 by which the pressure on the liquid 23 may be increased or decreased.

It is obvious that an increase in pressure on the liquid 23 will raise its boiling point while a decrease in pressure will lower its boiling point. Therefore, by proper operation of the bellows 52 the temperature at which the liquid 23 boils may be made to fall at practically any point. It is also apparent that once the constitution of the liquid 23 is known and its physical constants determined, the boiling point depends solely on the pressure. A pressure gauge 53 connected to the expansion chamber 51 may therefore be made to read in terms of the boiling temperature of the liquid; that is, when the circuit is interrupted, the indicator on the gauge, if correctly calibrated, will show what the boiling temperature is. Of course, the gauge does not read in temperatures except with regard to the moment at which the fluid is boiling and therefore interrupting the current. By this means it is possible to use the transducer 50 as a thermometer to indicate with great exactness what is the maximum temperature over the area to which the transducer 50 is exposed.

The transducer 50, when connected in the circuit shown in Fig. 10, may be used as a hunting device to continually hunt for the maximum temperature. For this purpose a second, entirely independent expansion chamber 54 is provided to hold another fluid 55. The bellows 56 for the expansion chamber 54 is joined with the bellows 52 of the expansion chamber 51 by a rod 57. Movement of the rod is opposed normally by a spring 58. As shown in Fig. 10, this connection is such that an expansion of the fluid 55 (e.g., through an increase in temperature) will bring about a reduction of pressure in the expansion chamber 51 and therefore will tend to cause the fluid 23 to boil.

A source 60 of electric current is connected in series with the transducer 23, and a resistance type heater 61 placed in series with this source 60 and the electrodes 25 and 26 may be used to heat the expansion chamber 54. So long as the fluid 23 does not boil, current will pass through the resistance 61 and will heat the fluid 55 thereby expanding it. This expansion will, through the rod 57, cause an expansion of the bellows 52 thereby reducing the pressure on the fluid 23. The heating will be kept up and the fluid 55 will get hotter, causing further expansion of its bellows 56 and a further reduction of the pressure on the liquid 23 until the combination of the reduced pressure on the liquid 23 and the maximum ambient temperature to which any point along the transducer 50 is exposed, reach the critical value at which at least a portion of the liquid 23 boils. When it does boil, the gauge 53 will indicate the temperature at which it is boiling. Or a gauge 63 may be attached to the expansion chamber 55 to read in terms of the temperature at which the liquid 23 boils, or a strain gauge may be connected to the rod 57, or other indicating means may be employed.

When the liquid 23 boils, not only is the temperature indicated but also the circuit is broken and therefore the heater 61 cools off permitting the liquid 55 to cool until such time as the liquid 23 drops below the boiling point and then the heater 54 is started again. This continuous interaction between the liquids 23 and 55 means that the circuit of Fig. 10 will continually seek out the maximum temperature to which the liquid 23 is exposed at any point along the transducer 50.

In place of indicators or gauges, relays may be used to bring about some desired action. Also it may be desirable in certain instances to use the circuit to control a relay which then controls the current to heater 61. This would permit the current through transducer fluid 23 to be very small.

Use of the transducer in a control circuit

Figures 11, 12:
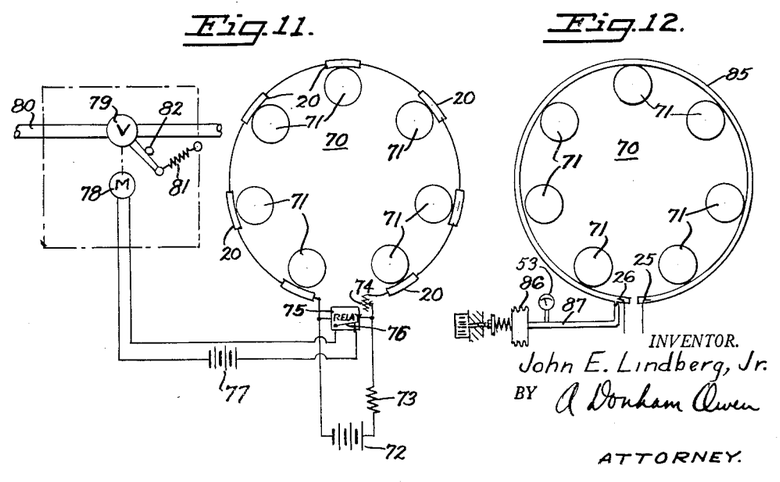
Fig. 11 is a diagrammatic view showing how a series of transducers may be used in a circuit to control the fuel feed for a jet aircraft engine.
Fig. 12 is a view similar to Fig. 11, showing how a single transducer may be used for the same purpose.

Fig. 11 shows diagrammatically how the transducer 20 may be used in a control circuit for feeding fuel to a jet aircraft engine 70. Here it is desired to maintain the engine temperature very near a maximum figure, but not to exceed that maximum figure. The higher the temperature, the greater the power and efficiency of the engine 70, but if it gets too hot, the engine 70 will be damaged. Accordingly, a series of transducers 20 are placed around the engine 70 (e.g., one at each combustion 71), with the boiling point of the liquid 23 inside them being set for the desired maximum temperature and below the temperature which would be harmful to the engine 70. When the temperature does increase beyond the desired amount, at any point in any of the transducers 20, the circuit is broken.

The transducers 20 are in series with a power source 72 and with a resistance 73. A variable resistor 74 is placed in series with the transducers 20 and a relay 75 is placed in parallel with them, so that the circuit here is generally similar to that of Fig. 9, with a relay substituted for the neon flash bulb. Preferably, the relay 75 draws no current, except when the circuit is broken somewhere in one of the transducers 20.

The relay 75 operates a switch 76 that controls a second electric circuit having a power source 77. This circuit operates a motor 78 that controls a valve 79 in the fuel supply line 80. Normally a spring 81 causes the valve 79 to tend toward its fully open position, too wide an opening being prevented by the stop 82. Whenever the relay 75 is actuated, the motor 78 begins to oppose the spring 81 and to reduce the fuel passing through the valve 79.

As soon as the temperature in the combustion chamber 71 cools off and the gas in the transducer 20 condenses, current flows through the transducers 20, and then the relay 75 is opened, the reduction of flow of fuel is stopped, and the spring 81 causes the fuel flow to increase.

In this instance the flow is ordinarily (that is so long as current flows through the transducers 20) set at an amount which is the maximum practicable flow. Then the engine 70 will naturally tend up toward the maximum temperature and will be maintained near that temperature by the control action of the transducers 20 and the transducer-controlled relay 71.

The variable resistor 74 makes it possible to vary the current through the transducers 20 and thereby raise the temperature of the liquid therein, so as to increase the sensitivity of the device and in some cases to trigger the reaction at a somewhat different level of ambient temperature.

Fig. 12 shows a single long transducer 85 substituted for the series of short transducers 20, with the same result. Here, also, a bellows arrangement 86 on a projecting end 87 of the transducer 85, makes it possible to regulate the critical temperature by regulating the pressure on the fluid. In addition, a fluid pressure gauge 53 makes it possible to read the maximum temperature in the system at the time the liquid first boils, especially when the gauge 53 is calibrated to give a direct temperature reading.

Although the transducers in Figs. 11 and 12 are shown adjacent the combustion chambers 71, they may be placed in or across the flame area inside the chambers for more direct control. A series-connected relay (as in Fig. 16) may be used instead of a parallel-connected relay. Figs. 11 and 12 are only representative of what may be done; the transducer would normally be incorporated as part of an overall power control system to control the throttle of fuel flow or to vary the turbine exhaust area, to obtain maximum efficiency without exceeding the critical temperature.

*Engine analyzer for detecting location of circuit breaks*

Figure 13:
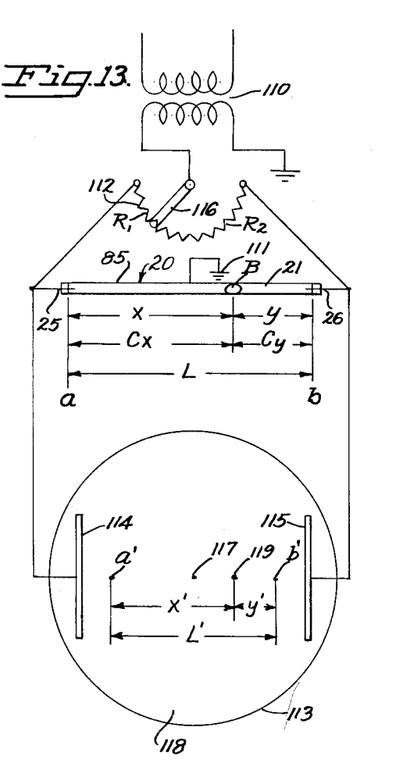
Fig. 13 is a diagrammatic view of an arrangement similar to that shown in Fig. 12, illustrating the use of alternating current and a cathode ray oscilloscope in an engine analyzer for locating the actuating circuit break which is the location of the maximum temperature point.
Figure 14:
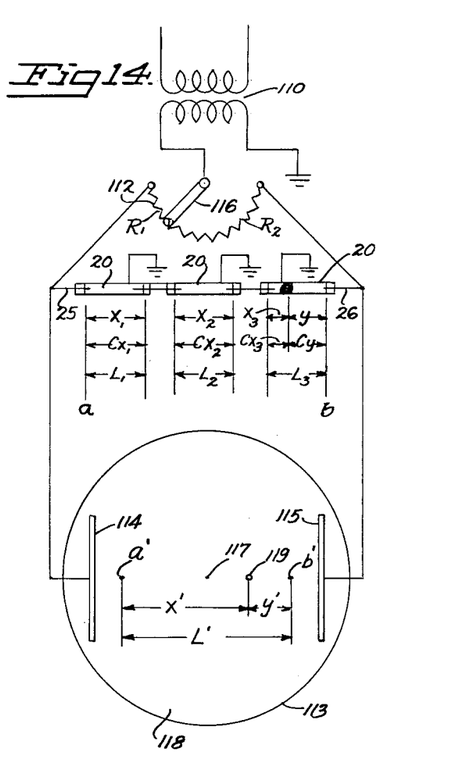
Fig. 14 is a view similar to Fig. 13, based on the use of a series of transducers as in Fig. 11.

Another type of engine-analyzer circuit is represented in Figs. 13 and 14. The transducer elements, it will be understood, will be disposed as Fig. 11 or Fig. 12. The present circuits are used to analyze the actuating circuit break by locating its exact position, which is the position of the maximum temperature along the line of the transducer.

Here a source 110 of alternating current is used with a single transducer 20 (Fig. 13) or a series of them (Fig. 14), having outer walls of metal or other conducting material. They are disposed as are the transducers 20 and 85 in Figs. 11 and 12, but the complete arrangement shown in those figures is not illustrated, for simplicity's sake. The outer metal wall 21 of the transducer 20 is grounded at 111, as is one side of the A.-C. power source 110.

The maximum temperature has already been obtained by the use of the Fig. 12 analyzer. Its location will now be obtained by another application of the engine analyzer. This is supplemental to the other functions of the engine analyzer shown in my Patent No. 2,518,427 of August 8, 1950. The present setup may be placed into and out of connection with the analyzer cathode ray indicator tube of that patent by a simple switch, preferably incorporated as a part of the engine analyzer condition selector switch.

A potentiometer 112 is placed across the transducer electrodes 25, 26, and a cathode ray tube 113 is also connected across the same electrodes. Only two facing plates 114, 115 of the tube 113 need be used, though a four plate tube can be used and is normally used in the engine analyzer.

When a bubble B breaks the column of fluid in a tube 85, the location of the bubble B is to be determined, i.e. the distances $x$ and $y$ which make up the two segments of liquid in the tube and add up to its full length L. The effect then is to make of the two liquid columns two condensers $Cx$ and $Cy$, the value of whose capacitances may be determined.

One method of determining $x$ and $y$ begins by adjusting the arm 116 of the potentiometer 112 to bring the light beam in the tube 113 to the center 117 of the cathode ray tube screen 118. The position of the arm 116 then corresponds to the position of the bubble B, and can be calibrated to give the distances $x$ and $y$, for the resistances $R_1$ and $R_2$ are then in the same proportion as $x$ and $y$, i.e. $R_1:R_2::x:y$.

The second method is to make $R_1=R_2$ at all times, as fixed components. Then the position of the light beam is calibrated on the screen 118, and if the beam is at 119, that will represent the position of bubble B. The screen 118 is calibrated by locating two points $a'$ and $b'$ on the screen 118 corresponding to the position of the beam when the bubble B is at positions $a$, $b$, respectively at each end of the transducer 20. Then the distance L' between $a'$ and $b'$ corresponds to the distance L between $a$ and $b$ and the ratio of $x'$ to $y'$ corresponds to the ratio of $x$ to $y$.

It should be borne in mind that the impedances $R_1$ and $R_2$ are resistances and that condensers are even preferable to resistors, as this would then make the circuit a pure capacitance bridge because the result of the bubble B is to make the two columns of liquid in the tube into condensers $Cx$ and $Cy$, separated by the bubble B.

The Fig. 14 circuit differs principally from the Fig. 13 circuit in having a plurality of transducers 20 in place of the transducer 85. The length L is therefore made up of a series of segments $L_1$, $L_2$, $L_3$ etc., in each transducer 20. The distance between successive transducers is immaterial for there is no capacitance in the connections between them. The transducers may all be the same length, or some may be longer than others, but the analyzer will show the location of the bubble B in terms of total transducer length. The operation is otherwise identical with that of Fig. 13. If either circuit is used in the Fig. 11 arrangement, the analyzer will locate the hottest combustion chamber.

In place of the tube 113, a voltmeter can be used in the analyzer, or the circuit shown could be replaced by a capacitance measuring device to give the values of $Cx$ and Cy or their ratio. The fact that the value of either capacitance Cx or Cy may be obtained of course makes it possible to use the transducer 20 as a condenser whenever there is a dielectric between the liquid and the metal outer wall (e.g., the plastic 21 in Fig. 6, or an insulating coating in a metal transducer shell). Since the location of the bubble B can be found by a capacitance measuring device, it is obvious that the existence of the bubble B can be determined in the same manner, by the change in capacitance indicated. It will be apparent that the same transducer may be used to detect the presence of fire, etc. by indicating the change in capacitance instead of the change in resistance.

From the foregoing it will be seen that a great variety of transducers may be made according to the principles of the above invention. It will also be seen that a great variety of fire-detection systems may be made with various differences in circuitry and that different types of warning systems and control devices may be actuated by the transducer. It will also be apparent that, in addition to fire detection or temperature control, the transducer 20 and the circuits to which it is adapted may be used for other temperature, or pressure, or temperature-and-pressure control. Since temperature may be created by various forms of energy which have themselves been caused by other effects, a transducer may be used with suitable apparatus to control other effects indirectly.

It will be understood that in any of these transducers the change of state could also be from a liquid to a solid and vice versa, so long as an appreciable change in resistance results from the change in state.

The transducer has no moving parts, is very simple to manufacture in quantity, it is able to withstand considerable shock or other damage and lends itself to a versatility of operations that is not equaled by any analogous device known heretofore. It makes it feasible to install fire warning systems in private homes and to keep them inconspicuous or even concealed beneath the wall and to give automatic alarm indications and to set off controls.

Obviously, instead of indicating the attainment of a high temperature or low pressure at a desired point by breaking an electrical circuit, the same transducer may be used to indicate when the last point along the transducer has attained a selected low temperature or, alternately, the highest pressure, over a given transducer path. This may be determined by normally having the fluid at least partly in the gaseous state and having it complete a normally broken circuit when all the gas becomes a liquid. In this case the warning device or indicator will normally be in series with the transducer.

A transducer with flexible walls can well be used to indicate maximum pressure, for local pressure along the transducer will then be able to readily deflect the wall 21 of the continuous transducer and thereby directly affect the pressure in the fluid 23. The ability of the transducer fluid to expand in volume should be curtailed, so that the maximum local pressure will not flatten out the tube only locally (see Fig. 5), but will transmit this maximum pressure undiminished throughout the fluid 23, making only a slight local effect as distinguished from the general effect.

In considering the varied applications of the device, it should be borne in mind that it is adapted to use by A.-C. and D.-C., and can actuate either parallel-placed signals or relays or series-placed ones.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A transducer, including in combination an elongated closed container of substantially constant cross-sectional area over a major portion of its length; an electrically conductive liquid completely filling said container at a predetermined pressure, the container walls contacting said liquid being of electrically insulating material; means for maintaining said liquid under the predetermined pressure; and a pair of electrodes at each end of said major portion respectively spaced apart by said liquid in said major portion for passing a current through the liquid of a value below that at which the liquid will boil at the predetermined pressure, so that when any portion of said liquid in said major portion boils due to external application of heat thereto, the electric current flow between the electrodes will be interrupted.

2. A fire detection apparatus in accordance with claim 1, a source of substantial voltage providing said current, and a signal means in parallel with said electrodes, said signal being responsive to said voltage when the current through said liquid is blocked by the boiling of any portion thereof and otherwise unresponsive to the voltage.

3. A fire-detection apparatus in accordance with claim 1, a source of substantial voltage providing said current, a resistance in series with said source and said electrodes; a condenser in series with said resistance and in parallel with said electrodes; and a signal means in parallel with said electrodes and with said condenser, said signal being responsive to said voltage when the current through said liquid is blocked by the boiling of a portion thereof and otherwise unresponsive to the voltage.

4. A fire-detection apparatus in accordance with claim 1, a source of substantial voltage providing said current, a resistance in series with said electrodes; a condenser in parallel with said electrodes; and a signal means in parallel with said electrodes, said signal being responsive to said voltage when the current through said liquid is blocked by the boiling of a portion thereof and otherwise being unresponsive to the voltage.

5. A temperature-control apparatus in accordance with claim 1, so that the electrical connection between them depends upon current passing through said liquid, said liquid becoming non-conductive when vaporized; a source for said current; a relay in parallel with said electrodes; and means controlled by said relay for reducing the temperature to which said liquid is subjected when the current between said electrodes is broken.

6. A temperature control apparatus in accordance with claim 1, a source for said current in series with said electrodes; means for varying the current passing through said container between said electrodes; a relay connected to said current source and actuated only when the circuit between said electrodes is broken; and control means actuated by said relay for controlling external phenomena leading to the breaking of said circuit between said electrodes.

7. A temperature-control apparatus in accordance with claim 1, current passing between them only through said liquid and being interrupted by vaporization of any part of said liquid between said electrodes; a source for said current; a relay in parallel with said electrodes; means controlled by said relay for reducing the temperature to which the liquid is subject when current between said electrodes is broken.

8. A temperature control apparatus in accordance with claim 1, a source for said current in series with said liquid; and means actuated by a temperature-caused change of state of any portion of said liquid between said electrodes, for changing the external temperature conditions of said container.

9. A maximum-temperature locating analyzer for determining the location of the highest temperature along a known path, including in combination: a transducer for detecting a maximum temperature by a vapor bubble interrupting a current flow through an electrically conductive liquid in a container, between terminals, the said maximum temperature causing said liquid to boil and produce the vapor bubble; a source of electrical potential connected to at least one of the two terminals of said transducer and to the outer walls of said container; and means for indicating the ratio of the capacitance of the liquid between one terminal of said transducer and said bubble to the capacitance of the liquid between the opposite terminal of said transducer and said bubble.

10. A maximum-temperature locating analyzer for determining the location of the highest temperature along a known path, including in combination a transducer for detecting a maximum temperature by a vapor bubble interrupting a current flow through an electrically conductive liquid in a container, between terminals, the said maximum temperature causing said liquid to boil and produce the vapor bubble; a source of electrical potential connected to at least one of the two terminals of said transducer and to the outer walls of said container; and means for indicating the value of the capacitance of the liquid between said terminal and said bubble.

11. A maximum-temperature locating system for detecting the location of the highest temperature along a known path, including in combination: means for detecting a maximum temperature by a vapor bubble interrupting a current flow through an electrically conductive liquid, said means including at least one metal container with an insulated lining and spaced electrodes and said liquid providing the current path between said electrodes whereby the said maximum temperature causes said liquid to boil and the vapor bubble is thereby produced, the metal body of said container being grounded; a source of alternating current, grounded on one side; two impedances with one side of each connected to the ungrounded side of said current source; means connecting the opposite sides of said impedances respectively to the opposite ends of said temperature-detecting means; and means in parallel with said temperature-detecting means for indicating the ratio of the capacitance formed between one end of said temperature-detecting means and said bubble and the capacitance formed between the opposite end of said temperature-detecting means and said bubble.

12. A transducer, including in combination an elongated hollow container having its containing walls of electrical insulating material enclosing a volume of relatively small cross-sectional area with rigidity sufficient to provide a substantially constant inner periphery thereof under considerable variation in internal pressure; electrically conductive liquid completely filling said container volume; a pair of electrodes electrically insulated from and spaced apart from each other, one near each end of said elongated container, the electrical connection between them depending solely upon the electric current flow through said electrically conductive liquid, whereby when said liquid boils at any point in said elongated container between said electrodes, the current flow will be interrupted; and means for expanding the enclosed volume of said container in response to increased internal expansion of the liquid due to its boiling, to a volume able to accommodate the pressure change involved.

13. An electrical transducer, including in combination an elongated hollow tube of flattened cross-section and of sufficient rigidity to maintain a small, substantially constant periphery throughout substantially its entire length, even when subjected to high internal pressure, by changing its cross-section to a more nearly circular shape, and having sufficient elasticity to resume its original flattened periphery upon a drop in internal pressure, the inner surface at least of said tube being electrically insulating; an electrically conductive liquid completely filling said tube; and a pair of electrodes in said tube spaced apart by said liquid and insulated from each other except by the liquid between them, whereby heat at any point between said electrodes sufficient to cause gassing of said liquid will cause a bubble to form and interrupt the current flow between electrodes, said change in shape under pressure being able to accommodate the pressure change involved.

14. An electrical transducer, including in combination an elongated hollow tube of flattened cross-section and of sufficient rigidity to maintain a small, substantially constant periphery throughout substantially its entire length even when subjected to high internal pressure, by changing its cross-section to a more nearly circular shape, and having sufficient elasticity to resume its original flattened periphery upon a drop in internal pressure, said tube having an inner wall of electrically insulating material jacketed in a shell of metal able to withstand high temperatures; an electrically conductive liquid completely filling said tube; and a pair of electrodes in said tube spaced apart by said liquid and insulated from each other except by the liquid between them, whereby heat at any point between said electrodes sufficient to cause gassing of said liquid causes a bubble to form and interrupt the current flow between electrodes, said change in shape under pressure being able to accommodate the pressure change involved.

15. A temperature-reading and maximum-temperature hunting system, comprising: a source of electric current; a first container filled with electrically conductive liquid having known boiling points at known pressures, the container walls in contact with said liquid being of electrically insulating material, said first container having a pressure-responsive portion; electrodes in said container in series with said current source and connected to each other only by current flow through said liquid, said current flow ceasing when any portion of said liquid is vaporized by boiling; a second container filled with fluid and having a pressure-responsive portion; means operatively connecting the pressure-responsive portions of said containers in inverse relationship, so that an increase in pressure in said second container causes a reduction in pressure in said first container, and a decrease in pressure in said second container causes an increase in pressure in said first container; electric heating means for heating said second container so as to increase the pressure therein, said electric heating means being in series with said electrodes and the liquid between them; and means for reading the pressure of said liquid in said first container when it boils and thereby interrupts the current between said electrodes and therefore the current to said electric heating means, thereby indicating the temperature of said liquid, whereby said heating means heats said second container and increases the pressure therein, resulting in a drop in pressure in said first container until said liquid boils, the temperature of said first container being indicated by the pressure at the time of boiling.

16. A temperature-reading and maximum-temperature-hunting system, including in combination: a source of electric current; an elongated tube having two spaced-apart electrodes connected to said source of current; electrically conductive liquid filling the tube between said electrodes and serving as the sole current path between them, said liquid having a known relation between its boiling point and the pressure on it, boiling thereof resulting in breaking the circuit between said electrodes; a pressure-responsive container communicating directly with the interior of said tube, so that when said liquid in said tube suffers an increase in pressure, as due to a rise in temperature, said liquid causes said container to expand, and so that when said pressure-responsive container expands, the pressure on said liquid drops, lowering the boiling point thereof; a second container filled with a separate fluid and having a pressure-responsive portion; means for externally interconnecting said pressure-responsive container and said pressure-responsive portion so that an increase in pressure in said second container brings about a decrease in pressure in said tube, and a decrease in pressure in said second container brings about an increase in pressure in said tube; electric means for heating said second container and thereby increasing the pressure therein, said electric means being in series with said electrode and the liquid between them, so that flow of current through said liquid results in the heating of said second container until the increase of pressure in said second container so reduces the pressure in said tube that said liquid boils at the hottest portion thereof; and means for indicating the pressure of said liquid in said tube at the time it boils, said pressure thereby giving the boiling temperature of said liquid and reading its temperature, while the system continuously hunts the maximum temperature along said tube, as indicated by the boiling of said liquid at any point between said electrodes.

17. A temperature-reading and maximum-temperature system, comprising: a source of electric current; a container filled with fluid that is electrically conductive when in its liquid state and substantially non-conductive when in its vapor state; electrodes in said container insulated from each other and connected electrically only by the fluid between said electrodes when said fluid in its liquid state makes a continuous column, said electrodes and the fluid therebetween being in series with said current source; means actuated electrically by current in series with said electrodes for decreasing the pressure on said fluid so long as current flows through said fluid in its liquid state and for increasing the pressure on said fluid when the current ceases to flow across said fluid because of a portion thereof being in its vajor state; and means for reading the temperature at which said fluid changes state.

18. A peak temperature-reading system, comprising: a source of electric current; containing means enclosing an electrically conductive liquid that, when it changes state to a vapor, becomes substantially non-conductive; electrodes in said containing means insulated from each other and connected electrically only by said liquid, said electrodes and the liquid therebetween being in series with said current source; means for varying the pressure on said liquid independently of temperature so as to vary the boiling point; and means for indicating the ambient temperature at which said liquid boils.

19. A temperature control apparatus, comprising: an elongated tube having an electrically insulating inner surface; an electrically conductive liquid in said tube; a pair of electrodes sealed in said tube; a source of current in series with said liquid providing a current through the liquid of a value below that at which the liquid will boil; and means actuated by a temperature-caused change of state of any portion of said liquid between said electrodes, for changing the internal pressure conditions of said tube to affect the boiling point of said liquid, the current being interrupted by the boiling of the liquid.

20. A system for detecting maximum ambient temperature comprising: an electrically conductive liquid; means for confining said liquid in a narrow column; means for placing an electrical potential lengthwise across said column, the boiling of said liquid at any point along said column interrupting the flow of current thereacross; means for varying the pressure on said liquid independently of temperature until said liquid boils at some point in said column and interrupts the flow of current thereacross; and means for measuring the pressure at which said boiling occurs.

References Cited in the file of this patent

UNITED STATES PATENTS

| | | |
|---|---|---|
| 1,537,281 | Winsch | May 12, 1925 |
| 2,094,211 | Grant | Sept. 28, 1937 |
| 2,163,709 | Schimkus | June 27, 1939 |
| 2,195,199 | Becker | Mar. 26, 1940 |
| 2,273,928 | Brian | Feb. 24, 1942 |
| 2,306,728 | Heddaeus | Dec. 29, 1942 |
| 2,346,836 | Grooms | Apr. 18, 1944 |
| 2,485,778 | Ryles | Oct. 25, 1949 |
| 2,488,622 | Giorgianni | Nov. 22, 1949 |
| 2,586,252 | Peters | Feb. 19, 1952 |
| 2,640,313 | Cobb | June 2, 1953 |
| 2,642,228 | Machlet | June 16, 1953 |
| 2,677,736 | Ryles | May 4, 1954 |
| 2,724,105 | Ekman | Nov. 15, 1955 |

FOREIGN PATENTS

| | | |
|---|---|---|
| 715,429 | France | Sept. 28, 1931 |

OTHER REFERENCES

Publication: "Continuous Tube Fire Detector," in Aviation Week, May 1, 1950, page 25.

UNITED STATES PATENT OFFICE
CERTIFICATION OF CORRECTION

Patent No. 2,985,870                                                    May 23, 1961

John E. Lindberg, Jr.

It is hereby certified that error appears in the above numbered patent requiring correction and that the said Letters Patent should read as corrected below.

Column 1, line 58, for "circuit" read -- circuits --; column 7, line 53, before "or" insert an opening parenthesis; column 12, line 39 to 41, strike out "so that the electrical connection between them depends upon current passing through said liquid, said liquid becoming non-conductive when vaporized;"; same column 12, line 55, beginning with "7. A temperature-control" strike out all to and including "electrodes in broken." in line 62, same column 12; column 15, line 27, for "vajor" read -- vapor --; columns 12 to 16, the claims numbered 8 to 20 should be renumbered as claims 7 to 19; in the heading to the printed specification, line 7, for "20 Claims." read -- 19 Claims. --.

Signed and sealed this 3rd day of July 1962.

(SEAL)
Attest:

ERNEST W. SWIDER                                            DAVID L. LADD
Attesting Officer                                              Commissioner of Patents